United States Patent
Mizuta et al.

(10) Patent No.: US 12,057,740 B2
(45) Date of Patent: Aug. 6, 2024

(54) ROTARY ELECTRIC MACHINE

(71) Applicant: Mitsubishi Electric Corporation, Tokyo (JP)

(72) Inventors: Takahiro Mizuta, Tokyo (JP); Kazumasa Ito, Tokyo (JP); Takayuki Yasumori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 316 days.

(21) Appl. No.: 17/423,912

(22) PCT Filed: Mar. 27, 2019

(86) PCT No.: PCT/JP2019/013326
§ 371 (c)(1),
(2) Date: Jul. 19, 2021

(87) PCT Pub. No.: WO2020/194593
PCT Pub. Date: Oct. 1, 2020

(65) Prior Publication Data
US 2022/0085674 A1 Mar. 17, 2022

(51) Int. Cl.
*H02K 1/276* (2022.01)
*H02K 21/14* (2006.01)

(52) U.S. Cl.
CPC .......... *H02K 1/2766* (2013.01); *H02K 21/14* (2013.01); *H02K 2213/03* (2013.01)

(58) Field of Classification Search
CPC .. H02K 1/17; H02K 1/14; H02K 1/16; H02K 1/2766; H02K 21/14; H02K 2213/03
(Continued)

(56) References Cited

U.S. PATENT DOCUMENTS

2008/0185932 A1 8/2008 Jajtic et al.
2012/0242268 A1 9/2012 Yashiro et al.
(Continued)

FOREIGN PATENT DOCUMENTS

EP 2333935 A1 * 6/2011 ........... H01F 7/0221
EP 2693613 A1 * 2/2014 ............ H02K 21/44
(Continued)

OTHER PUBLICATIONS

Office Action issued Mar. 30, 2023 in Korean Patent Application No. 10-2021-7028289 with Computer-generated English translation thereof, 15 pages.
(Continued)

*Primary Examiner* — Jose A Gonzalez Quinones
(74) *Attorney, Agent, or Firm* — XSENSUS LLP

(57) ABSTRACT

An object is to obtain a rotary electric machine, capable of reducing an eddy current loss which is caused in a magnet member provided in a stator. A rotor and a stator which is arranged to face to the rotor in a radial direction of the rotor are provided. The stator has a stator core, a stator coil, and a magnet member. The stator core has a core back and teethes, and the teethes protrude from the core back toward the rotor and are arranged along a circumferential direction. The stator coil is wound to each of the plurality of teethes, and is arranged in a slot formed between teethes lying next to each other in the circumferential direction. The magnet member is formed of a plurality of permanent magnets in each of the teethes.

14 Claims, 9 Drawing Sheets

(58) Field of Classification Search
USPC ............ 310/154.01, 154.02, 154.11, 154.13, 310/154.21, 181, 49.28, 49.46
See application file for complete search history.

(56) References Cited

U.S. PATENT DOCUMENTS

| | | | |
|---|---|---|---|
| 2015/0171677 A1 | 6/2015 | Moon et al. | |
| 2017/0250594 A1 | 8/2017 | Asano et al. | |

FOREIGN PATENT DOCUMENTS

| | | | | |
|---|---|---|---|---|
| JP | 2006115578 A | * | 4/2006 | |
| JP | 2006115878 A | * | 5/2006 | |
| JP | 2006238565 A | * | 9/2006 | |
| JP | 2009-509490 A | | 3/2009 | |
| JP | 2011-166868 A | | 8/2011 | |
| JP | 2013-176259 A | | 9/2013 | |
| JP | 2015-119617 A | | 6/2015 | |
| JP | 5791713 B2 | | 10/2015 | |
| JP | 2016-032385 A | | 3/2016 | |
| JP | 2018-074890 A | | 5/2018 | |
| JP | 2018074890 A | * | 5/2018 | |
| WO | 2011/148457 A1 | | 12/2011 | |
| WO | WO-2013157165 A1 | * | 10/2013 | ............... H02K 1/12 |

OTHER PUBLICATIONS

International Search Report and Written Opinion mailed on Jun. 18, 2019, received for PCT Application PCT/JP2019/013326, Filed on Mar. 27, 2019, 14 pages including English Translation.

Office Action issued Oct. 4, 2023 in Korean Patent Application No. 10-2021-7028289 with Machine English Translation thereof, 13 pages.

* cited by examiner

ROTARY ELECTRIC MACHINE

CROSS-REFERENCE TO RELATED APPLICATION

The present application is based on PCT filing PCT/JP2019/013326, filed Mar. 27, 2019, the entire contents of which are incorporated herein by reference.

FIELD OF THE INVENTION

The present disclosure relates to a rotary electric machine which is equipped with a stator, provided with a permanent magnet.

BACKGROUND OF THE INVENTION

In rotary electric machines, such as a motor of industry use and a motor of in vehicle use, downsizing of an outer size, higher output power, and higher operational speed have been required. As the rotary electric machine which can meet these demands, proposed is a rotary electric machine whose rotor is made of iron cores, and whose coils and permanent magnets are provided on a stator side. For example, Patent Document 1 discloses a rotary electric machine in which a primary side magnetic pole component has a plurality of tooth modules, and the plurality of tooth modules is equipped with winding wires and at least one permanent magnet. The permanent magnet is formed from a single body or division structure.

When the rotor of a rotary electric machine is rotated, a current flows in a coil and magnetic flux is generated. The magnetic flux interlinkages with a permanent magnet, and an eddy current flows in the permanent magnet, so that variations of the magnetic flux can be cancelled out. Thereby, an eddy current loss is caused. Particularly, in the rotary electric machine which includes a permanent magnet provided on the stator side, the permanent magnet stands still, with respect to a revolving magnetic field. Therefore, a great amount of eddy current loss is caused, and the efficiency of the rotary electric machine is decreased. For example, in order to solve this problem, Patent Document 2 employs a bond magnet, as a magnet of magnetic field use, which includes resin of insulation property, as one of the main ingredients. Since the bond magnet is low in the electric conductivity, eddy current which is generated in the bond magnet can be reduced. However, when a bond magnet with a low electric conductivity is used, the output power of a rotary electric machine falls, since the bond magnet is inferior to a sintered magnet in magnetic force.

Further, in the rotary electric machine which includes a permanent magnet provided on a rotor side, dividing the permanent magnet is proposed to reduce an eddy current loss. For example, a rotary electric machine of permanent magnet type is proposed in Patent Document 3, which has a first permanent magnet formed of first magnet pieces, divided along the shaft direction of the rotor core, and a second permanent magnet formed of second magnet pieces, divided along a direction crossing with the shaft direction of the rotor core. The first permanent magnet and the second permanent magnet are inserted separately in the magnet holes of the rotor core.

CITATION LIST

Patent Literature

Patent Document 1: JP 2009-509490 T
Patent Document 2: JP 2016-32385 A
Patent Document 3: JP 2013-176259 A

SUMMARY OF THE INVENTION

Technical Problem

However, in the rotary electric machine which includes a permanent magnet provided on the stator side, no considerations have been made as to dividing a permanent magnet, to reduce an eddy current loss. Depending on the direction for dividing and arranging permanent magnets, it was difficult to restrain the eddy current efficiently, and to reduce the eddy current loss, The present disclosure is made in order to solve the subject mentioned above, and aims at obtaining a rotary electric machine which is capable of reducing an eddy current loss, where the eddy current loss is caused in the permanent magnet, provided on the stator side of the rotary electric machine.

Solution to Problem

The rotary electric machine in accordance with the present disclosure has a rotor and a stator which is arranged to face to the rotor, holding a space in a radial direction of the rotor. The stator comprises: a stator core, having a core back of cylindrical shape and a plurality of teethes, where each of the plurality of teethes protrudes from the core back toward the rotor, and is provided along a circumferential direction of the rotor, a stator coil, being wound to each of the plurality of teethes, and being arranged in a slot which is formed between teethes lying next to each other in the circumferential direction, and a magnet member, having a plurality of permanent magnets disposed in each of the plurality of teethes, where each of the plurality of permanent magnets has the same magnetic pole each other in the circumferential direction, and is arranged in a protruding direction of the teeth.

Further, the rotary electric machine in accordance with the present disclosure has a rotor and a stator which is arranged to face to the rotor, holding a space in a radial direction of the rotor. The stator comprises: a stator core, having a core back of cylindrical shape and a plurality of teethes, where each of the plurality of teethes protrudes from the core back toward the rotor, and is provided along a circumferential direction of the rotor, a stator coil, being wound to each of the plurality of teethes, and being arranged in a slot which is formed between teethes lying next to each other in the circumferential direction, and a magnet member, having a permanent magnet disposed in each of the plurality of teethes, where the permanent magnet is magnetized in a circumferential direction and a groove portion extending in a shaft direction of the rotor is formed on a surface along both a protruding direction of the teeth of the permanent magnet and the shaft direction of the rotor.

Advantageous Effects of Invention

In a rotary electric machine in accordance with the present disclosure, the rotary electric machine is provided with a magnet member in which each of a plurality of permanent magnets has the same magnetic pole each other in the circumferential direction, and is arranged in the protruding direction of the teeth. Or the rotary electric machine is provided with a magnet member in which a permanent magnet is magnetized in the circumferential direction, and a groove portion extending in the shaft direction of the rotor is formed on the surface along both the protruding direction of the teeth of the permanent magnet and the shaft direction. Thereby, the path of an eddy current is divided in the protruding direction of the teeth, and then, the magnitude of an eddy current which flows in a permanent magnet can be restrained efficiently, and the eddy current loss can be reduced.

DESCRIPTION OF EMBODIMENTS

Hereinafter, explanation will be made about preferable embodiments of the present disclosure, with reference to drawings. In each of the drawings, the same code is assigned to same portions or corresponding portions, to offer a clear explanation.

Embodiment 1

Figure 1:
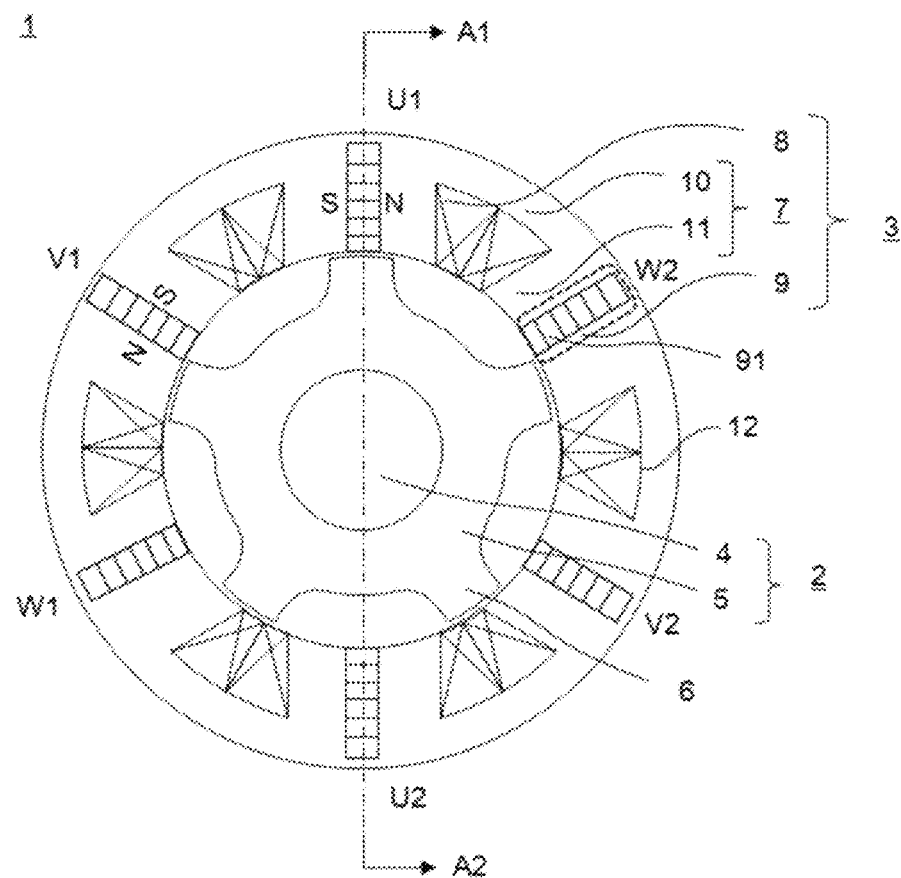
FIG. 1 is a sectional view showing a schematic structure of a rotary electric machine, in accordance with Embodiment 1 of the present disclosure.
Figure 2:
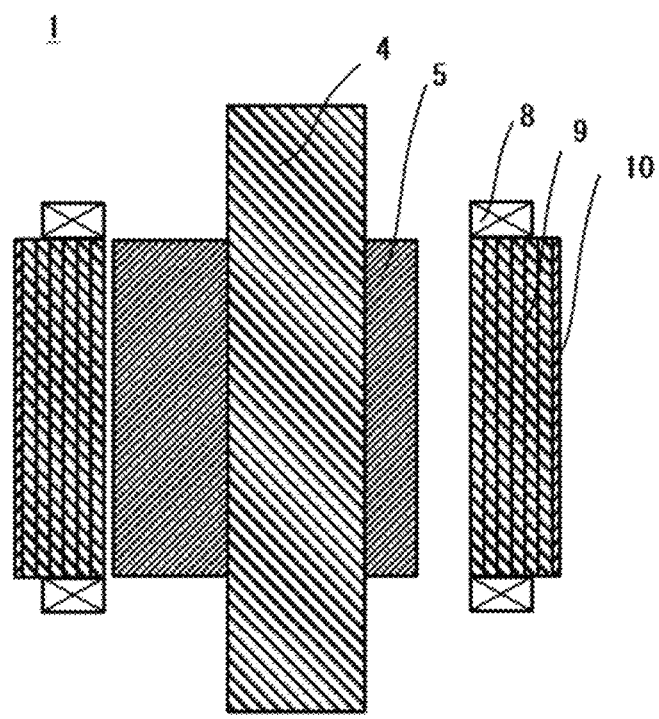
FIG. 2 is a sectional view showing a schematic structure of the rotary electric machine, in accordance with Embodiment 1 of the present disclosure.

FIG. 1 and FIG. 2 are sectional views for showing the schematic configuration of the rotary electric machine, in accordance with Embodiment 1 of the present disclosure. FIG. 1 is a sectional view which is drawn on a plane perpendicular to the shaft direction of the rotational shaft. FIG. 2 is a sectional view which is drawn on a plane along the shaft direction of the rotational shaft, and is a sectional view along the line A1-A2 of FIG. 1. As shown in FIG. 1, the rotary electric machine 1 is equipped with a rotor 2, and a stator 3 which is arranged to surround the rotor 2 in the circumferential direction, holding a space in between, on the outside in the radial direction of the rotor 2.

In the following explanation, the rotational direction of the rotor 2 is referred to as a circumferential direction, the direction of the rotational shaft 4 of the rotor 2 is referred to as a shaft direction, and the direction which directs from the rotational center of the rotor 2 toward the outer periphery side is referred to as a radial direction. Further, in the following explanation, a perpendicular direction includes also a roughly perpendicular direction.

The rotor 2 has a rotational shaft 4, and a rotor core 5 which is attached to the rotational shaft 4. The rotor core 5 is fixed to the rotational shaft 4, by burn in, press insert and the like. The rotor core 5 is provided with a plurality of protruding members 6 which protrudes to the outside in the radial direction. Each of the protruding members 6 is provided to hold a space in between with each other, in the circumferential direction of the rotor core 5.

The stator 3 has a stator core 7, a stator coil 8, and a magnet member 9. The stator core 7 is a magnetic body made of, for example, electromagnetic steel plates, which are layer stacked along the shaft direction. The stator core 7 has a core back 10 of cylinder shape and a plurality of teethes 11 which protrudes from the inner periphery surface side of the core back 10 to the inside in the radial direction. That is, each teeth 11 protrudes from the core back 10 toward the rotor 2, and in addition, is provided to hold a space in between with each other, along the circumferential direction. Between teethes 11 which lie next to each other in the circumferential direction, there is formed a slot 12 which is each opened spatially towards the rotor 2, and creates a space extending to the shaft direction. The slot 12 is provided with a stator coil 8 which is wound to the teeth 11. Further, a magnet member 9 is provided in each of the central parts in the radial direction of a plurality of teethes 11.

In each of the plurality of teethes 11, the magnet member 9 is, for example, provided to extend in both the protruding direction of the teeth 11 and the shaft direction, and is formed of permanent magnets 91 which are magnetized in the circumferential direction. The permanent magnets 91 of the magnet members 9 which lie next to each other in the circumferential direction by way of the slot 12 are arranged, facing the same magnetic pole with each other. That is, the permanent magnets 91 of the magnet member 9 which is provided in each of the plurality of teethes 11 are arranged, alternating their magnetic poles in the circumferential direction. The magnet member 9 is, for example, exposed from the teeth 11 on the inner periphery surface of the stator core 7, and is covered with the core back 10 on the outer periphery surface of the stator core 7. In the drawings, N and S indicate a magnetic pole of the permanent magnet 91 of the magnet member 9. As the permanent magnet 91 of the magnet member 9, those magnets are used whose electric conductivities are not zero, for example, rare earth sintered magnets, like a neodymium sintered magnet, and a ferrite magnet.

In each of the plurality of teethes 11, the magnet member 9 has a plurality of permanent magnets 91 which is arranged in the protruding direction of the teeth 11. The magnet member 9 is divided in plural, along the protruding direction of the teeth 11, by a surface with which a plurality of permanent magnets 91 faces each other. The permanent magnets 91 which are arranged in the protruding direction of the teeth 11 have the same magnetic pole with each other in the circumferential direction. Here, the definition that permanent magnets 91 have the same magnetic pole with each other in the circumferential direction includes not only a case in which a plurality of permanent magnets 91 is magnetized in the same direction in the radial direction, but also a case in which permanent magnets are magnetized in the same direction in the radial direction, within a fixed range where variations are considered. Further, the definition that a permanent magnet 91 is arranged in the protruding direction of the teeth 11 includes not only a case in which the permanent magnet 91 is arranged in a direction parallel to the protruding direction of the teeth 11, but also a case in which the permanent magnet 91 is arranged roughly in the parallel direction. In the example shown in FIG. 1, the magnet member 9 is divided into six, and six permanent magnets 91 are arranged. However, the embodiment here is not limited to this configuration.

In this way, the electric rotating machine is provided with the magnet members 9a and 9b which extend in the protruding direction of the teeth 11. Thereby, a possibility to cause a short circuiting of magnetic flux can be reduced, where the magnetic flux passes through the core back 10 or the teeth 11, without passing through the rotor 2. Further, since permanent magnets 91 which are magnetized in the circumferential direction are arranged in the protruding direction of the teeth 11, the permanent magnets 91 can have a larger cross sectional area of the circumference direction, and enhanced torque can be achieved.

In FIG. 1, here is shown an exemplary case in which the magnet member 9 has a plurality of permanent magnets 91 which is arranged in the protruding direction of the teeth 11. However, it is allowed to employ a magnet member 9, which has at least one permanent magnet 91 of a single body, magnetized in the circumferential direction, and is formed with at least one groove portion 13 extending in the shaft direction, where the groove portion 13 is formed on the surface along both the protruding direction of the teeth 11 of the permanent magnet 91 and the shaft direction.

Figure 3:
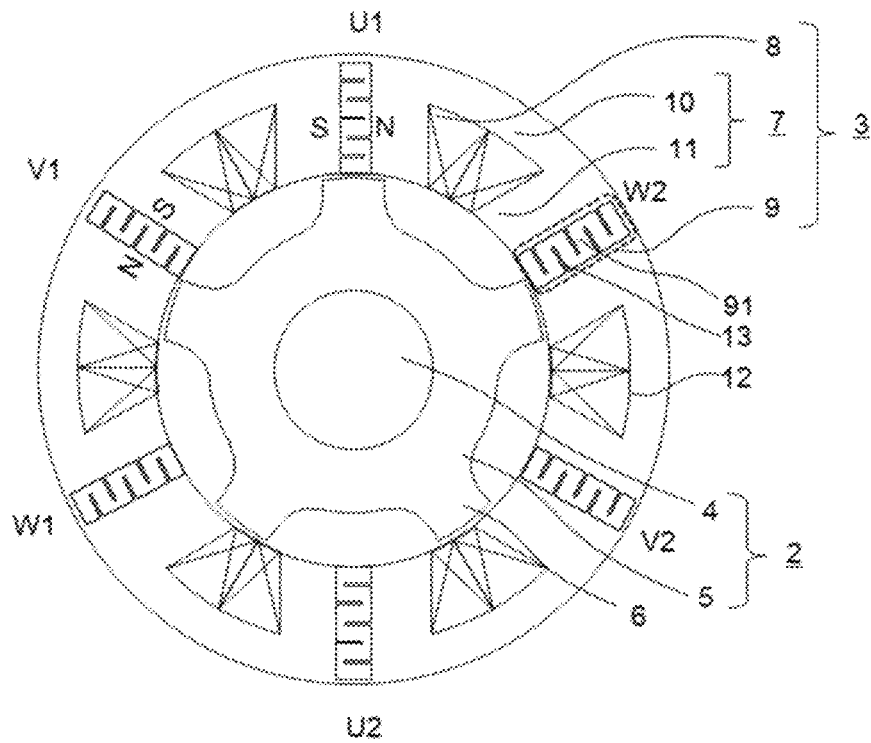
FIG. 3 is a sectional view showing a schematic structure of another example of the rotary electric machine, in accordance with Embodiment 1 of the present disclosure.

FIG. 3 is a sectional view for showing the schematic structure of another example of the rotary electric machine in accordance with Embodiment 1 of the present disclosure. As shown in FIG. 3, the magnet member 9 has, for example, a permanent magnet 91 of a single body, which extends in the protruding direction of the teeth 11 and the shaft direction. The magnet member is provided with a plurality of groove portions 13, on the surface along both the protruding direction of the teeth 11 of the permanent magnet 91 and the shaft direction. The groove portions extend in the shaft direction, holding a space in between with each other, along the protruding direction of the teeth 11. The magnet member 9 is divided into a plurality of domains, along the protruding direction of the teeth 11, by the groove portion 13. Both a domain between groove portions 13 which are adjacent each other along the protruding direction of the teeth 11 and a domain ranging from the surface along both the direction perpendicular to the protruding direction of the teeth 11 of the permanent magnet 91 and the shaft direction to the groove portion 13, correspond to one permanent magnet 91 which is shown in FIG. 1.

The groove portion 13 can be formed to penetrate in the shaft direction of the permanent magnet 91, and can be formed on a part of the shaft direction. Further, in FIG. 3, there is shown an exemplary case in which groove portions 13 are provided on both surfaces which face in the circumferential direction, along the protruding direction of the teeth 11 of the permanent magnet 91 and the shaft direction. However, the groove portion 13 can be provided only on one of the two surfaces.

The stator coil 8 is provided, for example, in each of the plurality of teethes 11, by concentrated winding, and is stored in the slot 12. The winding wire of the stator coil 8 is wound to the teeth 11 which is sandwiched by a pair of slots 12, lying next to each other in the circumferential direction. In the drawing, the winding wire which is wound to the teeth 11 is omitted.

For example, alternate current of three phases is supplied to the stator coil 8, and a revolving magnetic field is generated. Here, respective phases of the three phases are denoted by U phase, V phase, and W phase. Among respective stator coils 8, two U phase coils are referred to as U1 and U2, and two V phase coils are referred to as V1 and V2, and two W phase coils are referred to as W1 and W2. For example, as shown in FIG. 1, respective stator coils 8 are arranged in the counterclockwise direction to follow the order of U1, V1, W1, U2, V2, and W2. In the stator coil 8, a series circuit in which U1 and U2 are connected in series, a series circuit in which V1 and V2 are connected in series, and a series circuit in which W1 and W2 are connected in series, are connected at a common neutral point. When each phase is fed with a current which is out of phase with others by 120 degrees, a revolving magnetic field is generated.

Figure 4:
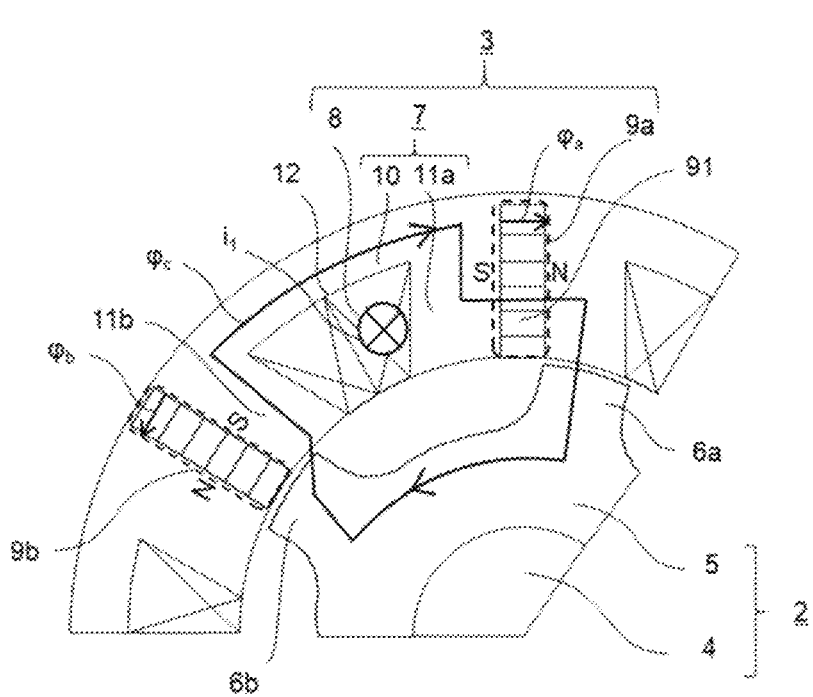
FIG. 4 is a schematic configuration diagram in which a portion of a rotary electric machine in accordance with Embodiment 1 of the present disclosure is enlarged.
Figure 5:
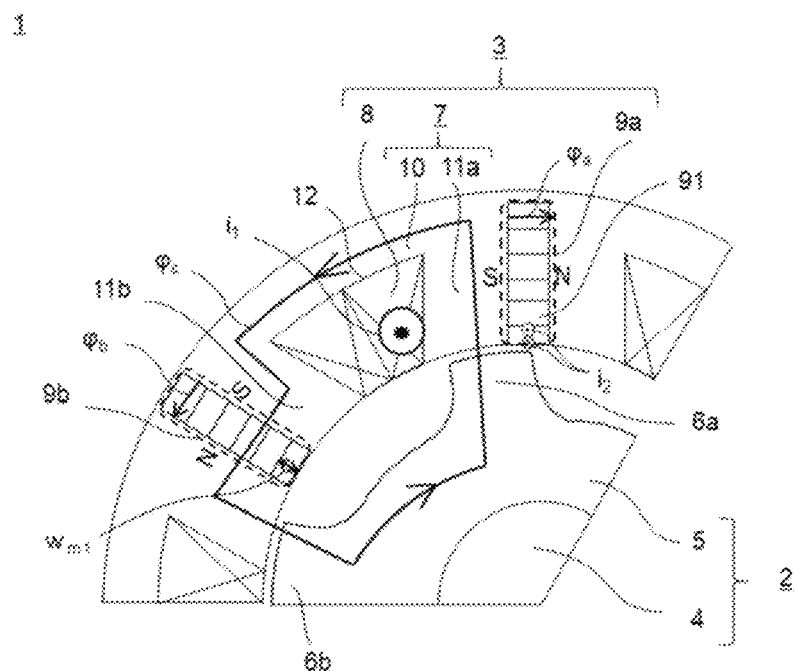
FIG. 5 is a schematic configuration diagram in which a portion of a rotary electric machine in accordance with Embodiment 1 of the present disclosure is enlarged.

FIG. 4 and FIG. 5 are schematic configuration diagrams in which a portion of a rotary electric machine in accordance with Embodiment 1 of the present disclosure is enlarged. Here, the rotor 2 is assumed to rotate in an anticlockwise direction. In FIG. 4 and FIG. 5, teethes 11 which lie next to each other, holding both sides of one slot 12 are referred to as a teeth 11a and a teeth 11b, in the counterclockwise order. It is assumed that the teeth 11a and the teeth 11b are provided with a magnet member 9a and a magnet member 9b, respectively. Further, protruding members 6 which lie next to each other in the rotor 2 are referred to as a protruding member 6a and a protruding member 6b, in the counterclockwise order. In the drawings, the direction symbol $i_1$ indicates a current which flows in the stator coil 8. The arrow Φc represents a magnetic flux, generated by current which flows in the stator coil 8. The arrow Φa and the arrow Φb represent magnetized directions of a magnet member 9a and a magnet member 9b, respectively. Those arrows express a part of magnetic fluxes which are made by the permanent magnet 91 itself, provided in the magnet member 9a and the magnet member 9b. It is assumed that the magnet member 9a has a plurality of permanent magnets 91, which is magnetized with N pole and S pole, in the order of counterclockwise rotation, and the magnet member 9b has a plurality of permanent magnets 91, which is magnetized with S pole and N pole, in the order of counterclockwise rotation.

As shown in FIG. 4, it is assumed that the magnet members 9a and 9b are located at the front in the radial direction of the protruding members 6a and 6b of the rotor 2. At this time, in the stator coil 8 which is provided in the slot 12, a current flows from one side of the shaft direction to the other side (from the front side of paper plane to the back side), and magnetic flux is generated by the current. The magnetic flux runs down from the teeth 1ib to the core back 10, and interlinkages with the magnet member 9a, in the direction perpendicular to the protruding direction of the teeth 11a. After that, the magnetic flux directs from the protruding member 6a of one side of the rotor 2 to the protruding member 6b of the other side, and returns to the teeth 11b and continues flowing.

Further, as shown in FIG. 5, it is assumed that the magnet members 9a and 9b are located on the back in the radial direction of the protruding members 6a and 6b of the rotor 2. At this time, in the stator coil 8 which is provided in the slot 12, a current flows from the other side of the shaft direction to one side (from the back side of paper plane to the front side), and magnetic flux is generated by the current. The magnetic flux runs down from the teeth 11a to the core back 10, and interlinkages with the magnet member 9b, in the direction perpendicular to the protruding direction of the teeth 1ib. After that, the magnetic flux directs from the protruding member 6b of one side of the rotor 2 to the protruding member 6a of the other side, and returns to the teeth 11a and continues flowing.

In this way, the phase of a current whose electric power is supplied in the stator coil 8 is changed. Thereby, the magnetic flux is controlled which path to take, the teeth 11a or the teeth 1ib, and then, torque is generated. At this time, since the spatial relationship between the magnet members 9a and 9b of the stator 3 and the protruding members 6a and 6b of the rotor 2, and the phase of the current undergo a change, magnetic fluxes which interlinkage with the magnet members 9a and 9b undergo a variation in the magnitude. For example, it is supposed that the rotor 2 rotates in the counterclockwise direction and the magnetic flux changes from the state of FIG. 4 to the state of FIG. 5. In FIG. 4, the magnetic flux which interlinkages with the magnet member 9a in the direction perpendicular to the protruding direction of the teeth 11 will decrease, if the spatial relationship of FIG. 5 is posed. Therefore, an eddy current flows in a section which is along both the protruding direction of the teeth 11 of the magnet member 9a and the shaft direction, so that variations of the magnetic flux can be cancelled out. In the rotary electric machine 1 in which a permanent magnet 91 is provided on the stator 3 side, the magnet member 9 stands still with respect to a revolving magnetic field, and is configured to extend in the protruding direction of the teeth 11. Thereby, when an eddy current flows along the protruding direction of the teeth 11, a great amount of eddy current loss is caused.

Figure 6:
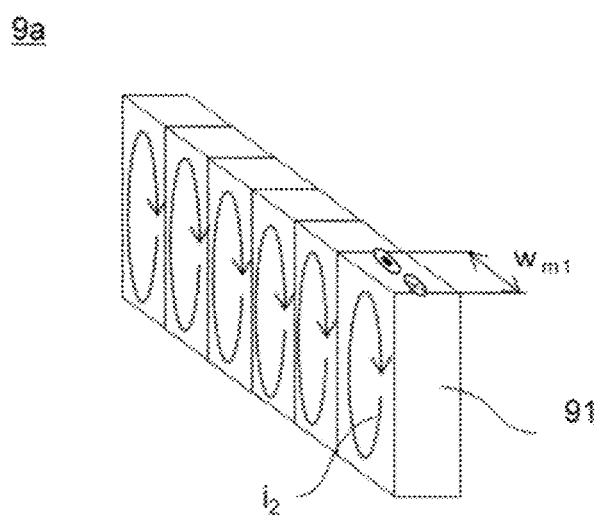
FIG. 6 is an explanatory diagram for explaining the eddy current which is generated in the permanent magnet of the rotary electric machine, in accordance with Embodiment 1 of the present disclosure.

FIG. 6 is an explanatory diagram for explaining the flow of the eddy current which is generated in the permanent magnet of the rotary electric machine in accordance with Embodiment 1 of the present disclosure. In FIG. 5 and FIG. 6, a direction symbol, arrow $i_2$, indicates the eddy current which is generated in the magnet member 9a. As shown in FIG. 6, since in the magnet member 9a, a plurality of permanent magnets 91 is arranged along the protruding direction of the teeth 11, the path of an eddy current is divided by the contact resistance of the surface with which a plurality of permanent magnets 91 faces each other, in the protruding direction of the teeth 11. That is, an eddy current flows in a loop shape, in each of the plurality of permanent magnets 91 which forms the magnet member 9a. Since the path of the eddy current is divided along the protruding direction of the teeth 11, the magnitude of an eddy current can be made smaller and the eddy current loss can be reduced.

Figure 7:
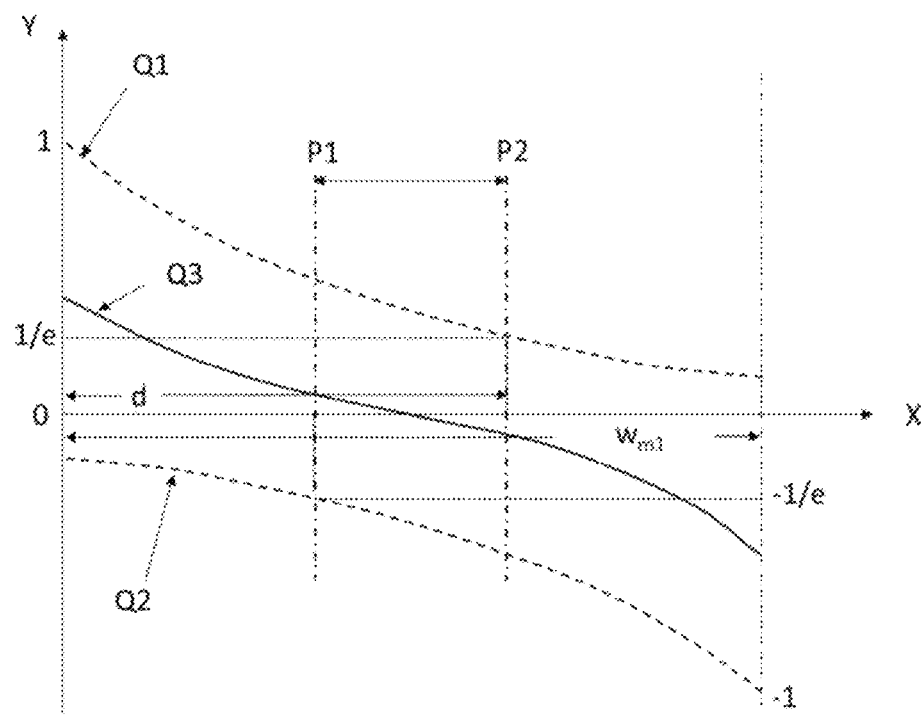
FIG. 7 is a relationship diagram showing the relation between the magnitude of an eddy current and the distance in the protruding direction of the teeth of a permanent magnet, where the eddy current is generated in the permanent magnet of the rotary electric machine, in accordance with Embodiment 1 of the present disclosure.

FIG. 7 is a relationship diagram showing the relation between the magnitude of the eddy current of the rotary electric machine in accordance with Embodiment 1 of the present disclosure and the distance in the protruding direction of the teeth of a permanent magnet. The vertical axis Y indicates the magnitude of an eddy current which flows in the shaft direction, through the section of the permanent magnet 91. The horizontal axis X indicates the distance from a closer surface to the rotor 2 to the opposite surface, where the closer surface to the rotor is among surfaces which face each other along both the direction perpendicular to the protruding direction of the teeth 11 of the permanent magnet 91 and the shaft direction. In the drawing, two dashed lines Q1 and Q2 indicate, respectively, the magnitude of an eddy current which flows from one side of the shaft direction of the permanent magnet 91 to the other side (from the front side of paper plane to the back side), and the magnitude from the other side of the shaft direction to one side (from the back side of paper plane to the front side). In FIG. 7, the magnitude of an eddy current inside of the permanent magnet 91 is expressed in terms of the rate, in which the magnitude of an eddy current on the surface of the permanent magnet 91 is set to one.

When the rotary electric machine 1 is rotating at a high speed, the current density of an eddy current is concentrated on the surface of the permanent magnet 91, due to a skin effect. Therefore, as shown in FIG. 7, the current which flows in the shaft direction of the permanent magnet 91 decreases from the surface thereof down to the inside. At a skin depth d, the current decreases to 1/e of the current which flows on the surface of the permanent magnet 91, where e indicates common logarithm. When an eddy current becomes small in the diameter of a loop, currents which flow in the opposing directions interfere each other, and cancel each other out. For example, in the region which is shown between P1-P2 of FIG. 7, a current which goes from one side of the shaft direction of the permanent magnet 91 to the other side, and a current which goes from the other side to one side, have both a magnitude larger than 1/e of the current which flows on the surface. However, those currents can cancel each other out, and then, an eddy current can be made as small as the magnitude shown by a solid line Q3 in the drawing.

Next, explanation will be made about the relationship between the length in the protruding direction of the teeth 11 of the permanent magnet 91 and the skin depth of an eddy current. In FIG. 5 and FIG. 6, an arrow $w_{m1}$ indicates a length in the protruding direction of the teeth 11 of the permanent magnet 91. As mentioned above, when the magnetic flux produced by a current which flows in the stator coil 8 interlinkages with the permanent magnet 91, an eddy current will start to flow. At this time, the skin depth d of an eddy current which flows in the permanent magnet 91 is shown below, using terms of ω, σ and μ, where ω is a career angular frequency of the inverter which drives a rotary electric machine, that is, an angular frequency of the current which flows in the stator coil 8, σ is an electric conductivity of the permanent magnet 91, and μ is a magnetic permeability.

[Equation 1]

$$d = \sqrt{\frac{2}{\omega\mu\sigma}} \quad (1)$$

The length $w_{m1}$ is supposed to a length in the protruding direction of the teeth 11 of the permanent magnet 91. It is preferable that the length $w_{m1}$ in the protruding direction of the teeth 11 of the permanent magnet 91 and the skin depth d should satisfy the following relation, in order to reduce an eddy current loss by the interference among eddy currents.

[Equation 2]

$$w_{m1} \leq 2d \quad (2)$$

Figure 8:
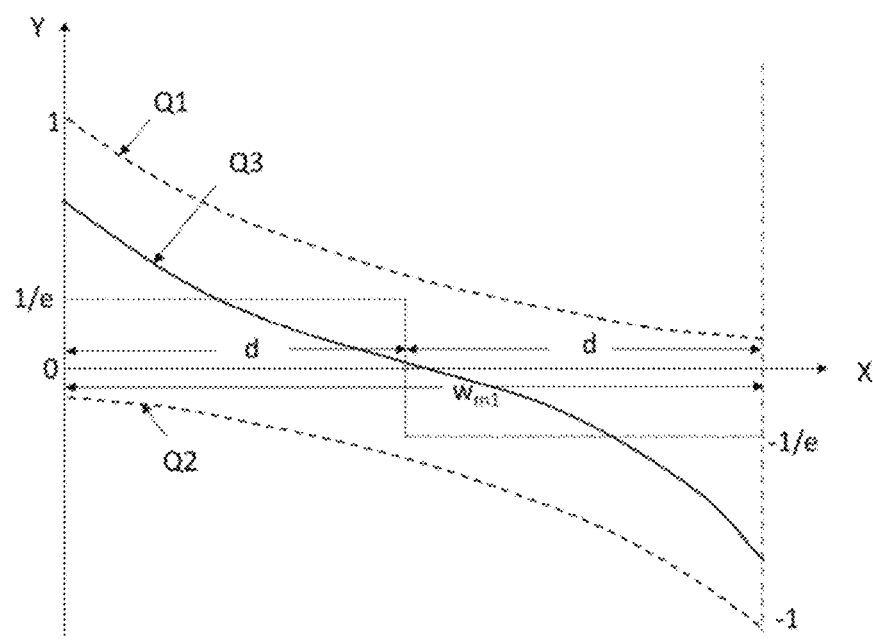
FIG. 8 is a relationship diagram showing the relation between the magnitude of an eddy current and the distance in the protruding direction of the teeth of a permanent magnet, where the eddy current is generated in the permanent magnet of the rotary electric machine, in accordance with Embodiment 1 of the present disclosure.

FIG. 8 is a relationship diagram showing the relation between the magnitude of the eddy current of the rotary electric machine in accordance with Embodiment 1 of the present disclosure and the distance in the radial direction of a permanent magnet. As another example of FIG. 7, FIG. 8 shows the magnitude of an eddy current, in a case where the length $w_{m1}$ in the protruding direction of the teeth 11 of the permanent magnet 91 and the skin depth d satisfy the following equation.

[Equation 3]

$$w_{m1} = 2d \quad (3)$$

As shown in FIG. 8, when the length $w_{m1}$ in the protruding direction of the teeth 11 of the permanent magnet 91 is twice as large as the skin depth d in magnitude, there exists no region in which currents which flow in the opposing directions, in the shaft direction of the permanent magnet 91, cancel each other out, at a magnitude larger than 1/e. As shown in the Equation 2, when the length $w_{m1}$ in the protruding direction of the teeth 11 of the permanent magnet 91 is made less than twice the skin depth d, in the eddy current which flows in the shape of a loop, there exists a region in which currents which flow in the opposing directions cancel each other out, at a magnitude larger than 1/e. Thereby, the eddy current can be restrained efficiently and the reduction effect of an eddy current can be increased.

Here, an exemplary case is explained in which the magnet member 9 includes a plurality of permanent magnets 91 which is arranged in the protruding direction of the teeth 11. In a case where the magnet member 9 is provided with a permanent magnet 91 of a single body, in which a groove portion 13 is formed, the length $w_{m1}$ in the protruding direction of the teeth 11 of the permanent magnet 91, corresponds to a length between groove portions 13 which lie next to each other in the protruding direction of the teeth 11, in the permanent magnet 91 and a length from the surface of the permanent magnet 91 to the groove portion 13. Similarly, when the length $w_{m1}$ in the protruding direction is made less than twice the skin depth, the reduction effect of an eddy current can be increased.

As mentioned above, the rotary electric machine in accordance with the present embodiment is equipped with a rotor 2 and a stator 3 which is arranged in the radial direction of the rotor 2, holding a space in between to face each other. The stator 3 is equipped with a stator core 7 which has a core back 10 of cylindrical shape and a plurality of teethes 11, a stator coil 8 which is wound to the teeth 11 and is arranged in the slot 12, and a magnet member 9 which has a plurality of permanent magnets 91 disposed to each of the plurality of teethes 11.

Each of the plurality of permanent magnets 91 of the magnet member 9 has the same magnetic pole each other in the circumferential direction, and in addition, is arranged along the protruding direction of the teeth 11. Or the magnet member 9 is formed of a permanent magnet 91 of a single body, which is magnetized in the circumferential direction. The permanent magnet 91 is provided with a groove portion 13 which extends in the shaft direction, and is disposed on the surface along both the protruding direction of the teeth 11 of the permanent magnet 91 and the shaft direction. Since the permanent magnet 91 is magnetized in the circumferential direction, the current flowing in the stator coil 8 generates the magnetic flux which can interlinkage with a larger area, and improved torque is achieved.

A current which flows in the stator coil 8 generates magnetic flux. The magnetic flux interlinkages with the magnet member 9, and an eddy current starts to flow. The path of the eddy current is divided, along the protruding direction of the teeth 11, by surfaces with which permanent magnets 91 face each other, or the groove portion 13 of the permanent magnet 91. Since the path of an eddy current is divided, the magnitude of an eddy current can be decreased efficiently, and the eddy current loss can be reduced, and improved torque can be achieved.

It is to be noted that, as for the magnet member 9, an insulator can be provided between each two of the plurality of permanent magnets 91, and on the inside of the groove portion 13. Further, coating can be conducted to respective permanent magnets 91, for rust proofing and the like. Thereby, division of an eddy current becomes further easier, and the eddy current loss can be reduced.

Figures 9, 10:
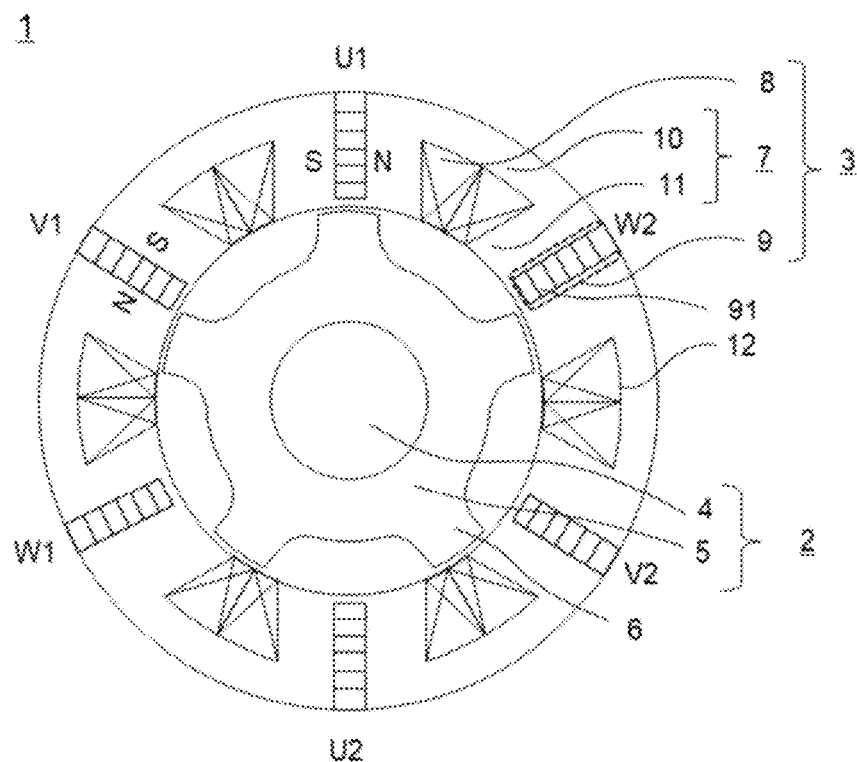
FIG. 9 is a sectional view for showing a schematic structure of another example of the rotary electric machine, in accordance with Embodiment 1 of the present disclosure.
FIG. 10 is a sectional view for showing a schematic structure of another example of the rotary electric machine, in accordance with Embodiment 1 of the present disclosure.

It is to be noted that, in FIG. 1, there is shown an exemplary case in which, among surfaces which face each other along the direction perpendicular to the protruding direction of the teeth 11 of the permanent magnet 91, a surface closer to the rotor 2 is exposed from the teeth 11, on the inner periphery surface of the stator core 7, and the opposite surface is covered with the core back 10 on the outer periphery surface of the stator core 7. However, other embodiments can be accepted. In what follows, among surfaces which face each other along the direction perpendicular to the protruding direction of the teeth 11, a surface closer to the rotor 2 is simply referred to as a surface on the facing side to the rotor 2. FIG. 9 and FIG. 10 are sectional views showing the schematic structure of another example of the rotary electric machine, in accordance with Embodiment 1 of the present disclosure. As shown in FIG. 9, the opposite surface of a surface on the facing side to the rotor 2 of the magnet member 9 is exposed on the outer periphery surface of the stator core 7, and the surface on the facing side to the rotor 2 can be covered with the teeth 11 on the inner periphery surface.

Further, as shown in FIG. 10, it is most preferable that the magnet member 9 is exposed from both the outer periphery surface of the stator core 7 and the inner periphery surface thereof, on the surface on the facing side to the rotor 2 and the opposite surface on the facing side. When the magnet member 9 is covered with the core back 10 or the teeth 11, on the outer periphery surface of the stator core 7 or the inner periphery surface thereof, magnetic flux passes through the core back 10 or the teeth 11, without passing through the rotor 2, and then, short circuiting is caused and the torque of the rotary electric machine 1 decreases. As shown in FIG. 10, since the magnet member 9 is exposed at both the outer periphery of the stator core 7 and the inner periphery thereof, magnetic flux can be prevented from causing a short circuiting, and reduction in torque can be restrained.

Further, in FIG. 10, the stator core 7 is divided at the central part in the radial direction of the teeth 11, and is fixed, holding the magnet member 9 in between. In this way, the stator core 7 can be a division core, which is divided in plural, in the circumferential direction.

Embodiment 2

Figure 11:
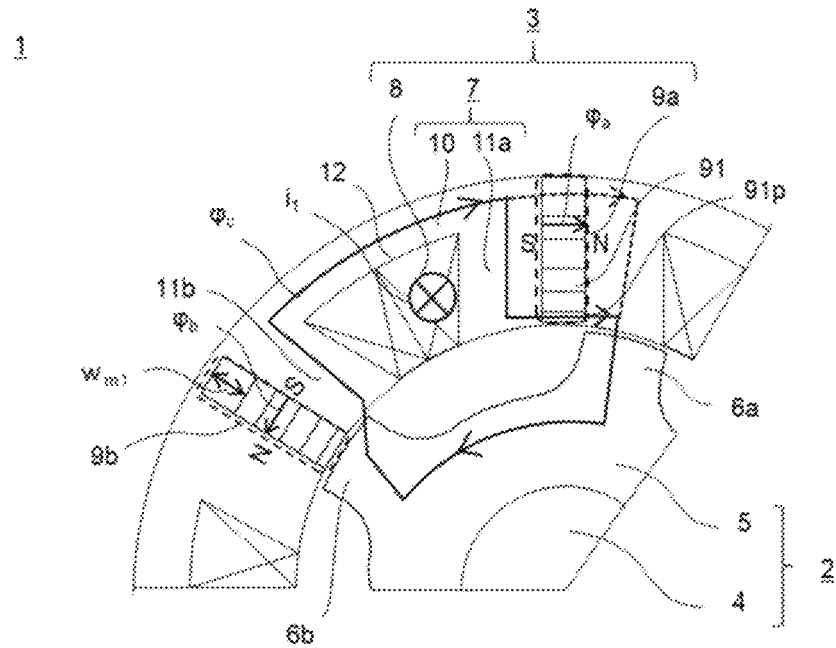
FIG. 11 is a schematic configuration diagram in which a portion of a rotary electric machine in accordance with Embodiment 2 of the present disclosure is enlarged.

FIG. 11 is a schematic configuration diagram in which a portion of a rotary electric machine in accordance with Embodiment 2 of the present disclosure is enlarged. In FIG. 11, the spatial relationship between the magnet member 9 of the stator 3 and the protruding member 6 of the rotor 2, the phase of a current, and respective magnetized directions of the permanent magnets 91, are the same as those of FIG. 4. In what follows, explanation about the same point as in Embodiment 1 is omitted, and explanation will be made focusing on a different point.

As shown in FIG. 11, the magnet member 9 is, for example, formed of a plurality of permanent magnets 91, which are arranged along the protruding direction of the teeth 11. Furthermore, in the present embodiment, the length in the protruding direction of the teeth 11 of the permanent magnet 91 becomes smaller, from the outer periphery side of the stator core 7 down to the inner periphery side, that is, as the location of a groove portion approaches the rotor 2.

As shown in FIG. 11, it is assumed that the magnet members 9a and 9b are located at the front in the radial direction of the protruding members 6a and 6b of the rotor 2. At this time, when electric power is supplied to the stator coil 8 which is provided in the slot 12, to flow a current from one side of the shaft direction to the other side (from the front side of paper plane to the back side), magnetic flux is generated by the current. The magnetic flux runs down from the teeth 1ib to the core back 10, and interlinkages with the magnet member 9a, in the direction perpendicular to the protruding direction of the teeth 11a. After that, the magnetic flux directs from the protruding member 6a of one side of the rotor 2 to the protruding member 6b of the other side, and returns to the teeth 1ib and continues flowing.

When a current flows through the stator coil 8, the current generates magnetic fluxes, which interlinkage with the magnet member 9a of the teeth 11a, and flow toward the protruding member 6a of one side of the rotor 2. Among those magnetic fluxes which interlinkage with the magnet member 9a, a magnetic flux, which is shown by a solid line φ a and passes through the inside in the radial direction becomes larger in quantity than a magnetic flux, which is shown by a dotted line φ a and passes through the outside in the radial direction of the stator core 7. This is because the path which passes through the outer periphery side of the stator core 7 is a longcut for reaching the rotor 2, and magnetic flux has a feature to flow in the shortest path. Therefore, the magnetic flux which passes through the outside in the radial direction of the stator core 7 becomes larger also in the change of magnetic fluxes per unit time, rather than the one which passes through the outside in the radial direction. As for the eddy current which is generated in the magnet member 9, an eddy current which is generated in the closest permanent magnet 91 to the rotor 2 becomes larger. In what follows, the permanent magnet 91 closest to the rotor 2 in the magnet member 9 is especially referred to as a permanent magnet 91p.

In the present embodiment, among a plurality of permanent magnets 91 which are arranged along the protruding direction of the teeth 11, a permanent magnet on the inside in the radial direction of the stator core 7, that is, the closest one to the rotor 2 is a permanent magnet 91p. The length in the protruding direction of the teeth 11 of the permanent magnet 91p is made small, compared with the remaining permanent magnets 91. Thereby, currents which flow in the opposing directions, in the shaft direction of an eddy current, are made easier to interfere with each other.

Here, in FIG. 11, explanation is made about an exemplary case in which a plurality of permanent magnets 91 are arranged in the magnet member 9. However, when the magnet member 9 includes a groove portion 13 which extends in the shaft direction and is formed on the surface along both the protruding direction of the teeth 11 of the permanent magnet 91 and the shaft direction, a distance between the groove portions 13 which are adjacent each other in the protruding direction of the teeth 11 of the permanent magnet 91, or a distance from the surface of the permanent magnet 91 to the groove portion 13 can be made smaller, as the location of a groove portion approaches the rotor 2.

As mentioned above, the rotary electric machine is equipped with a magnet member 9 which is formed of a plurality of permanent magnets 91 arranged in the protruding direction of the teeth 11, or a magnet member 9 which is formed of a permanent magnet 91 provided with a plurality of groove portions 13 along the protruding direction of the teeth 11. Thereby, the eddy current which flows in the magnet member 9 is made smaller and the eddy current loss can be reduced. Furthermore, in the present embodiment, in a case where the rotary electric machine is equipped with a magnet member 9 which is formed of a plurality of permanent magnets 91, the length in the protruding direction of the teeth 11 of the permanent magnet 91 is configured to gradually be made smaller, as the location of a groove portion approaches the rotor 2. Moreover, in a case where the rotary electric machine is equipped with a magnet member 9 which is formed of the permanent magnet 91 which is provided with the groove portion 13, the length between groove portions 13 which are adjacent each other along the protruding direction of the teeth 11, and the length from the surface of the permanent magnet 91 to the groove portion 13, are configured to gradually be made smaller, as the location of a groove portion approaches the rotor 2. In this way, the permanent magnet 91, which is close to the rotor 2, is easy to generate an eddy current, and the loop diameter of the eddy current is made smaller. Therefore, currents which flow in the opposing directions become easy to interfere each other, and the eddy current can be made small efficiently.

Here, in the example shown in FIG. 11, an exemplary case is shown in which the length $w_{m1}$ in the protruding direction of the teeth 11 of the permanent magnet 91 is made smaller gradually, as the location of a groove portion approaches the rotor 2. However, in order to reduce an eddy current loss, among a plurality of permanent magnets 91 which is arranged in the protruding direction of the teeth 11, the closest permanent magnet 91p to the rotor 2 just has to be smaller in length, compared with respective lengths of the remaining permanent magnets 91. Similarly, in a case where the magnet member 9 is formed of a permanent magnet 91 which is provided with a groove portion 13, the length from the surface on the facing side to the rotor 2 of the permanent magnet 91 to the groove portion 13 just has to be made smaller, compared with the length between other groove portions 13.

Embodiment 3

Figure 12:
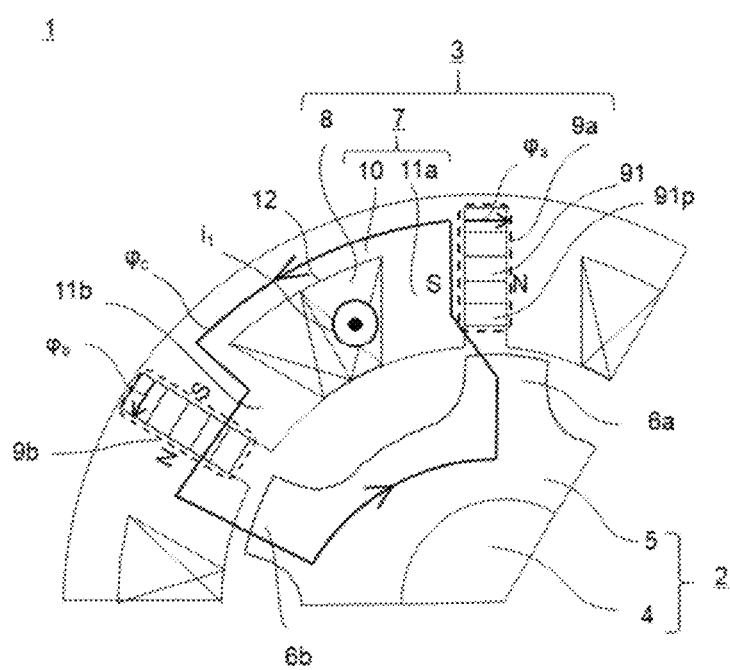
FIG. 12 is a schematic configuration diagram in which a portion of a rotary electric machine in accordance with Embodiment 3 of the present disclosure is enlarged.

FIG. 12 is a schematic configuration diagram in which a portion of a rotary electric machine in accordance with Embodiment 3 of the present disclosure is enlarged. In what follows, explanation of the same point as in Embodiment 1 is omitted, and explanation will be made focusing on a different point. In FIG. 12, the phase of a current and magnetized directions of the permanent magnets 91 are the same as those of FIG. 5.

The magnet member 9 is formed of a plurality of permanent magnets 91 which is arranged in the protruding direction of the teeth 11. Or the magnet member 9 is formed of a permanent magnet 91, which is provided with a groove portion 13, which extends in the shaft direction and is disposed on the surface along both the protruding direction of the teeth 11 and the shaft direction. Furthermore, in the present embodiment, the distance from the magnet member 9 to the rotor 2, with regard to the radial direction, is larger than the distance from the stator core 7 to the rotor 2, with regard to the radial direction.

For example, in a case where the magnet member 9 includes a plurality of permanent magnets 91 which is arranged in the protruding direction of the teeth 11, the closest permanent magnet 91p to the rotor 2, in the protruding direction of the teeth 11, is located on the outside in the radial direction, rather than a surface which is along the circumferential direction on the rotor 2 side of the stator core 7.

As shown in FIG. 12, it is assumed that the magnet member 9a is located, facing to the protruding member 6a of the rotor 2, and the magnet member 9b is located on the back in the radial direction of the protruding member 6b of the rotor 2. At this time, when electric power is supplied in the stator coil 8 which is provided in the slot 12, to flow a current from the other side of the shaft direction to one side (from the back side of paper plane to the front side), magnetic flux is generated by the current. The magnetic flux runs down from the teeth 11a to the core back 10, and interlinkages with the magnet member 9b, in the direction perpendicularly to the protruding direction of the teeth 11b. After that, the magnetic flux directs from the protruding member 6b of one side of the rotor 2 to the protruding member 6a of the other side, and returns to the teeth 11a and continues flowing.

Among surfaces which face each other along the protruding direction of the protruding member 6a, a first surface is located in the front side in the radial direction of the rotor 2, and among surfaces which face each other, along the protruding direction of the teeth 11a of the magnet member 9a, a second surface is located in the front side in the radial direction. When circumferential directionwise positions with the first surface and the second surface are comparable, the magnetic flux which is generated by the current which flows in the stator coil 8 flows from the protruding member 6a to the circumferential directionwise position of the magnet member 9a which faces to the protruding direction of the teeth 11. At this time, when the magnetic flux interlinkages with the magnet member 9a, in the protruding direction of the teeth 11, an eddy current will be generated due to the variations of the magnetic flux. In the example shown in FIG. 12, since the closest permanent magnet 91p to the rotor 2 is located on the outside in the radial direction, rather than the surface which is along the circumferential direction on the rotor 2 side of the stator core 7, magnetic flux flows into the teeth 11a, without the interlinkage with the magnet member 9a.

As mentioned above, since the rotary electric machine is equipped with a magnet member 9 which includes a plurality of permanent magnets 91 arranged along the protruding direction of the teeth 11, or a magnet member 9 which is formed of the permanent magnet 91, which is provided with a groove portion 13, extending in the shaft direction and disposed on a surface along both the protruding direction of the teeth 11 of the permanent magnet 91 and the shaft direction, the eddy current which flows in the magnet member 9 can be made small, and the eddy current loss can be reduced. Furthermore, in the present embodiment, the distance from the magnet member 9 to the rotor 2 with respect to the radial direction is larger than the distance from the stator core 7 to the rotor 2 with respect to the radial direction. Thereby, the magnetic flux which is generated by a current which flows in the stator coil 8 can be restrained from the interlinkage with the magnet member 9 along the protruding direction of the teeth 11, and the eddy current loss also can be further reduced.

Embodiment 4

Figure 13:
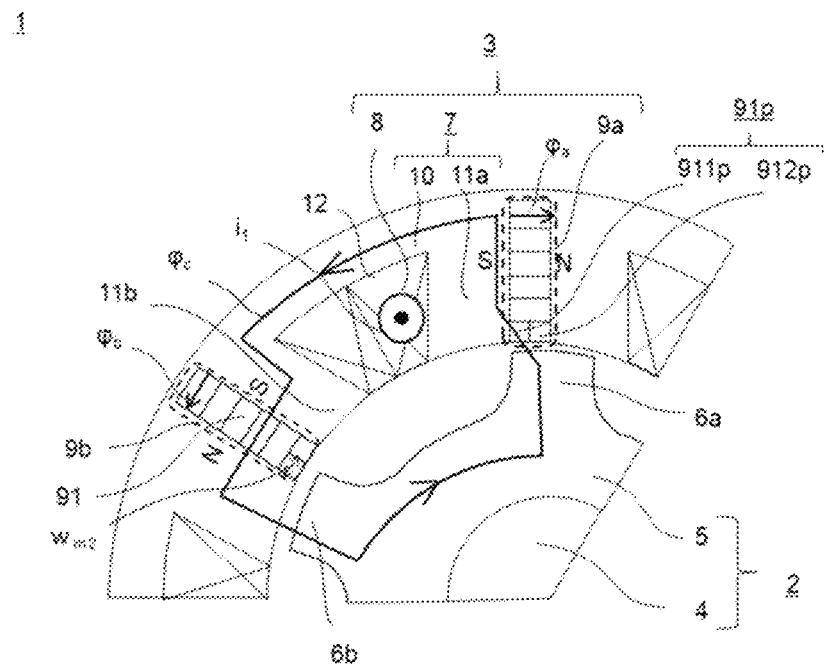
FIG. 13 is a schematic configuration diagram in which a portion of a rotary electric machine in accordance with Embodiment 4 of the present disclosure is enlarged.

FIG. 13 is a schematic configuration diagram in which a portion of a rotary electric machine in accordance with Embodiment 4 of the present disclosure is enlarged. In what follows, explanation about the same point as in Embodiment 1 is omitted, and explanation will be made focusing on a different point. In FIG. 13, the phase of a current and magnetized directions of the permanent magnets 91 are the same as those of FIG. 5.

The magnet member 9 is, for example, formed of a plurality of permanent magnets 91 which is arranged in the protruding direction of the teeth 11. Furthermore, in the present embodiment, the magnet member 9 has a plurality of permanent magnets 91 which is arranged in the direction perpendicular to the protruding direction of the teeth 11.

In the example shown in FIG. 13, among a plurality of permanent magnets 91 which are arranged in the protruding direction of the teeth 11, a permanent magnet 91p is the closest to the rotor 2, in the protruding direction of the teeth 11. The closest permanent magnet 91p to the rotor 2 is divided into two permanent magnets 911p and 912p, along the direction perpendicular to the protruding direction of the teeth 11.

As shown in FIG. 13, it is assumed that the magnet member 9a is located, facing the protruding member 6a of the rotor 2, and the magnet member 9b is located on the back in the radial direction of the protruding member 6b of the rotor 2. At this time, when electric power is supplied in the stator coil 8 which is provided in the slot 12, to flow a current from the other side of the shaft direction to one side (from the back side of paper plane to the front side), magnetic flux is generated by the current. The magnetic flux runs down from the teeth 11a to the core back 10, and interlinkages with the magnet member 9b, in the direction perpendicular to the protruding direction of the teeth 1ib. After that, the magnetic flux directs from the protruding member 6b of the rotor 2 to the protruding member 6a, and returns to the teeth 11a and continues flowing.

Among surfaces which face each other along the protruding direction of the protruding member 6a, a first surface is located at the front in the radial direction of the rotor 2, and among surfaces which face each other, along the protruding direction of the teeth 11a of the magnet member 9a, a second surface is located at the front in the radial direction. When the first surface and the second surface are comparably at circumferential directionwise positions, the magnetic flux which is generated by the current which flows in the stator coil 8 flows from the protruding member 6a, along the protruding direction of the teeth 11, to the circumferential directionwise position of the magnet member 9a which faces to the protruding member 6a. At this time, when magnetic flux interlinkages with the magnet member 9a, along the protruding direction of the teeth 11, an eddy current will be generated so that variations of the magnetic flux can be cancelled out.

Figure 14:
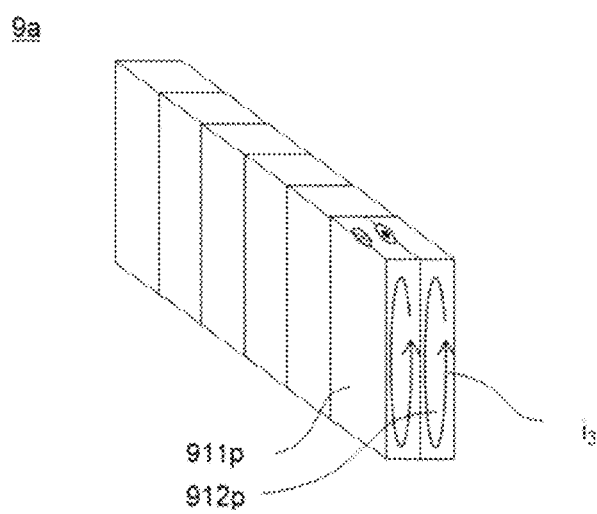
FIG. 14 is an explanatory diagram for explaining the eddy current which is generated in the permanent magnet of the rotary electric machine, in accordance with Embodiment 4 of the present disclosure.

FIG. 14 is an explanatory diagram for explaining the flow of an eddy current which is generated in the permanent magnet of the rotary electric machine in accordance with Embodiment 4 of the present disclosure. As shown in FIG. 14, in a case where magnetic flux interlinkages with the magnet member 9a, along the protruding direction of the teeth 11, an eddy current $i_3$ flows, loop-likely, in a section which is along the direction perpendicular to the protruding direction of the teeth 11 of the permanent magnets 911p and 912p and the shaft direction. In other words, on both sides in the radial direction of the permanent magnets 911p and 912p, currents flow in the opposing directions of the shaft direction.

As mentioned above, since the rotary electric machine is equipped with the magnet member 9 in which a plurality of permanent magnets 91 is arranged in the protruding direction of the teeth 11, the eddy current which flows in the magnet member 9 can be made small, and the eddy current loss can be reduced. Furthermore, in the present embodiment, the rotary electric machine is equipped with a plurality of permanent magnets 91 which is arranged in the direction perpendicular to the protruding direction of the teeth 11, and the path of an eddy current which flows along the direction perpendicular to the protruding direction of the teeth 11 is divided. Thereby, even in a case where magnetic flux interlinkages in the protruding direction of the teeth 11, respective currents which flow in the opposing directions, along the shaft direction of an eddy current cancel each other out, and an eddy current can be made small, and the eddy current loss can be further reduced. In particular, the permanent magnet 91p, which is the closest to the rotor 2 and easy to interlinkage with magnetic flux, along the protruding direction of the teeth 11, is divided in the direction perpendicular to the protruding direction of the teeth 11. Thereby, the reduction of an eddy current loss can be further enhanced.

It is to be noted that, in FIG. 13 and FIG. 14, there is shown an exemplary case in which the closest permanent magnet 91p to the rotor 2 alone is divided in the direction perpendicular to the protruding direction of the teeth 11. However, other permanent magnets 91 also can be divided in the direction perpendicular to the protruding direction of the teeth 11.

Figure 15:
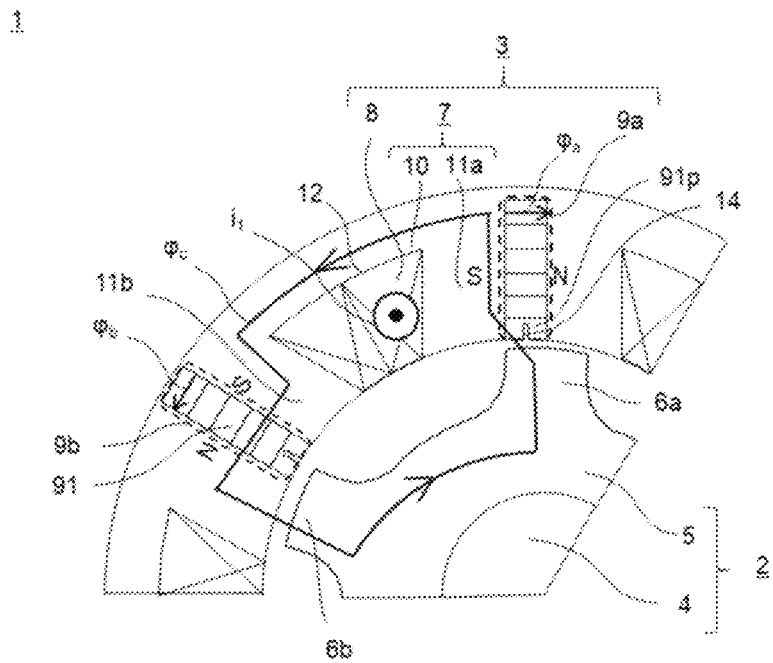
FIG. 15 is a schematic configuration diagram in which a portion of the rotary electric machine in accordance with Embodiment 4 of the present disclosure is enlarged.

Further, instead of dividing the magnet member 9 into a plurality of members, along the direction perpendicular to the protruding direction of the teeth 11, it is allowed that the rotary electric machine is provided with a permanent magnet 91 including a groove portion 14 which extends in the shaft direction and is formed on the surface, on the facing side to the rotor 2. FIG. 15 is a sectional view showing the schematic structure of another example of the rotary electric machine in accordance with Embodiment 4 of the present disclosure. In the example shown in FIG. 15, the groove portion 14 extends in the shaft direction and is provided on the surface, on the facing side to the rotor 2, of the closest permanent magnet 91p to the rotor 2, in the protruding direction of the teeth 11.

In this way, magnetic flux interlinkages along the protruding direction of the teeth 11 of the magnet member 9 and an eddy current is generated. The path of the eddy current is divided along the direction perpendicular to the protruding direction of the teeth 11. Thereby, even in a case where the groove portion 14 is provided, the magnitude of an eddy current can be reduced. Further, compared with the case in which a plurality of permanent magnets 91 is used as the magnet member 9, the magnet member 9 becomes easy to install to the teeth 11, and the stator 3 is improved in the assembly nature.

Here, the groove portion 14 can penetrate in the shaft direction of the magnet member 9, and can be provided on a part in the shaft direction, without penetrating. However, the length in the shaft direction of the groove portion 14 can never be too large, with respect to the length in the shaft direction of the magnet member 9. When the length in the shaft direction of the groove portion 14 is made large, the reduction effect of the eddy current loss induced by interference of the eddy current can be enhanced.

Further, a length $w_{m2}$ is defined as the length of the direction perpendicular to the protruding direction of the teeth 11 of the permanent magnet 91, which is divided in the direction perpendicular to the protruding direction of the teeth 11. In this case, it is preferable that the skin depth d satisfies the following relation.

[Equation 4]

$$w_{m2} \leq 2d \tag{4}$$

As shown in the Equation 4, when a length $w_{m2}$ is made less than twice the skin depth d, where the length $w_{m2}$ is a length of the direction perpendicular to the protruding direction of teeth 11 of the permanent magnet 91, there exists a region in which respective currents of the eddy current which flow in the opposing directions cancel each other out, at a magnitude larger than 1/e. Therefore, those currents can cancel each other out efficiently, and the reduction effect of an eddy current can be increased.

Here, it is supposed that the magnet member 9 is formed of the permanent magnet 91 which includes a groove portion 14 provided in the direction perpendicular to the protruding direction of the teeth 11. In this case, when a distance from the front surface of the permanent magnet 91 to the groove portion 14, or a distance between adjoining groove portions 14 is made less than twice the skin depth d, the reduction effect of an eddy current can be increased similarly.

Embodiment 5

Figure 16:
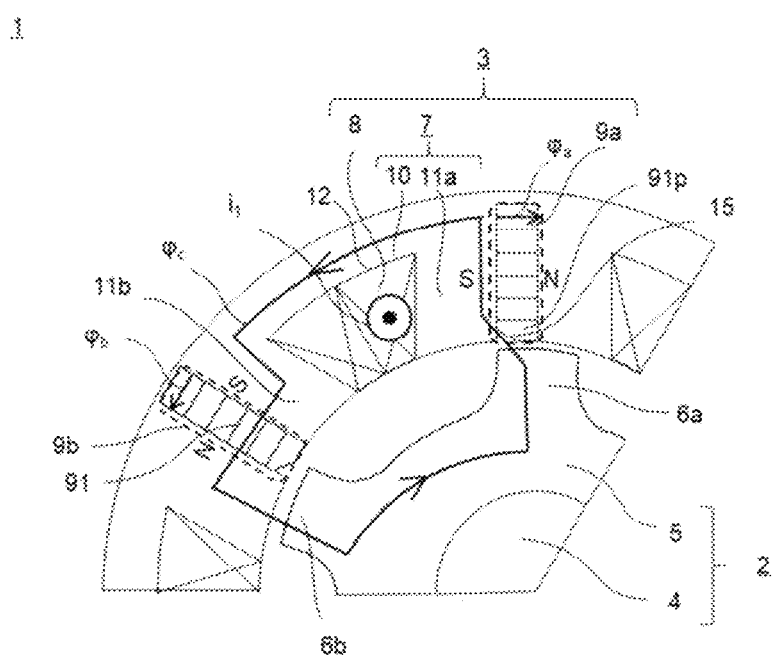
FIG. 16 is a schematic configuration diagram in which a portion of a rotary electric machine in accordance with Embodiment 5 of the present disclosure is enlarged.

FIG. 16 is a schematic configuration diagram in which a portion of a rotary electric machine in accordance with Embodiment 5 of the present disclosure is enlarged. In what follows, explanation about the same point as in Embodiment 1 is omitted, and explanation will be made focusing on a different point. In FIG. 16, the phase of a current and magnetized directions of the permanent magnets 91 are the same as those of FIG. 5.

The magnet member 9 is, for example, formed of a plurality of permanent magnets 91 which is arranged in the protruding direction of the teeth 11. Or the magnet member 9 is, for example, formed of a permanent magnet 91, which is provided with a groove portion 13 extending in the shaft direction and disposed on the surface along both the protruding direction and the shaft direction. Furthermore, in the present embodiment, a corner portion is formed by crossing of a surface along both the protruding direction of the teeth 11 and the shaft direction, and a surface which faces to the rotor 2. In the permanent magnet 91 of the magnet member 9, the corner portion is dropped off, and a chamfered surface 15 is formed. In what follows, the corner portion, which is formed by crossing of a surface along both the protruding direction of the teeth 11 of the permanent magnet 91 and the shaft direction, and a surface which faces to the rotor 2, is simply referred to as a corner portion on the facing side to the rotor 2.

In the example shown in FIG. 16, the corner portion at the rotational direction front, on the facing side to the rotor 2, is dropped off to form a chamfered surface 15. Among the permanent magnets 91 which are arranged in the protruding direction of the teeth 11, the closest permanent magnet 91$p$ to the rotor 2 is formed with the chamfered surface 15. In the permanent magnet 91$p$, the form of a cross-section which is perpendicular to the shaft direction is pentagon.

As shown in FIG. 16, it is assumed that the magnet member 9$a$ is located, facing to the protruding member 6$a$ of the rotor 2, and the magnet member 9$b$ is located on the back in the radial direction of the protruding member 6$b$ of the rotor 2. At this time, when electric power is supplied in the stator coil 8 which is provided in the slot 12, to flow a current from the other side of the shaft direction to one side (from the back side of paper plane to the front side), magnetic flux is generated by the current. The magnetic flux runs down from the teeth 11$a$ to the core back 10, and interlinkages with the magnet member 9$b$, in the direction perpendicular to the protruding direction of the teeth 11$b$. After that, the magnetic flux directs from the protruding member 6$b$ of the rotor 2 to the protruding member 6$a$, and returns to the teeth 11$a$ and continues flowing.

Among a pair of surfaces which faces with each other along the protruding direction of the protruding member 6$a$, a first surface is located at the front in the radial direction of the rotor 2, and among a pair of surfaces which faces with each other, along the protruding direction of the teeth 11$a$ of the magnet member 9$a$, a second surface is located at the front in the radial direction. When circumferential directionwise positions with the first surface and the second surface are comparable, the magnetic flux which is generated by the current which flows in the stator coil 8 flows from the protruding member 6$a$ along the protruding direction of the teeth 11, to the circumferential directionwise position of the magnet member 9$a$ which opposes to the protruding member 6$a$. At this time, when magnetic flux interlinkages with the magnet member 9$a$, along the protruding direction of the teeth 11, an eddy current will flow so that variations of the magnetic flux can be cancelled out, and an eddy current loss will be caused.

In the present embodiment, a corner portion at the rotational direction front, on the facing side to the rotor 2 is dropped off to form a chamfered surface 15. Among the permanent magnets 91 which are arranged in the protruding direction of the teeth 11, the closest permanent magnet 91$p$ to the rotor 2 has the chamfered surface 15, and then, magnetic flux returns from the protruding member 6$a$ to the teeth 11$a$, without the interlinkage with the magnet member 9$a$.

As mentioned above, the rotary electric machine is equipped with a magnet member 9 which is formed of a plurality of permanent magnets 91, arranged in the protruding direction of the teeth 11, or a magnet member 9 which is formed of a permanent magnet 91, which is provided with a groove portion 13 extending in the shaft direction, and disposed on the surface along both the protruding direction of the teeth 11 and the shaft direction. Thereby, the eddy current which flows in the magnet member 9 can be made small, and the eddy current loss can be reduced. Furthermore, in the present embodiment, a corner portion on the facing side to the rotor 2 is dropped off to form a chamfered surface 15, and the permanent magnet 91$p$ has the chamfered surface 15. Since magnetic flux returns from the protruding member 6$a$ to the teeth 11$a$, without the interlinkage with the magnet member 9$a$, the generation of an eddy current is restrained, and the eddy current loss can be further reduced.

It is to be noted that, in FIG. 16, a rotor is supposed to rotate in the counterclockwise rotating, and there is shown an exemplary case in which a corner portion which is located at a counterclockwise direction side, on the facing side to the rotor 2 of the permanent magnet 91, is dropped off. However, when a rotor rotates in a clockwise rotating, it is preferable that a corner portion at the clockwise direction side is dropped off, on the facing side to the rotor 2 of the permanent magnet 91. Further, when the rotor 2 rotates in both the counterclockwise rotating and the clockwise rotating, it is preferable that a corner portion at the counterclockwise rotation side and a corner portion at the clockwise rotation side are dropped off, and the permanent magnet has two chamfered surfaces 15.

Figure 17:
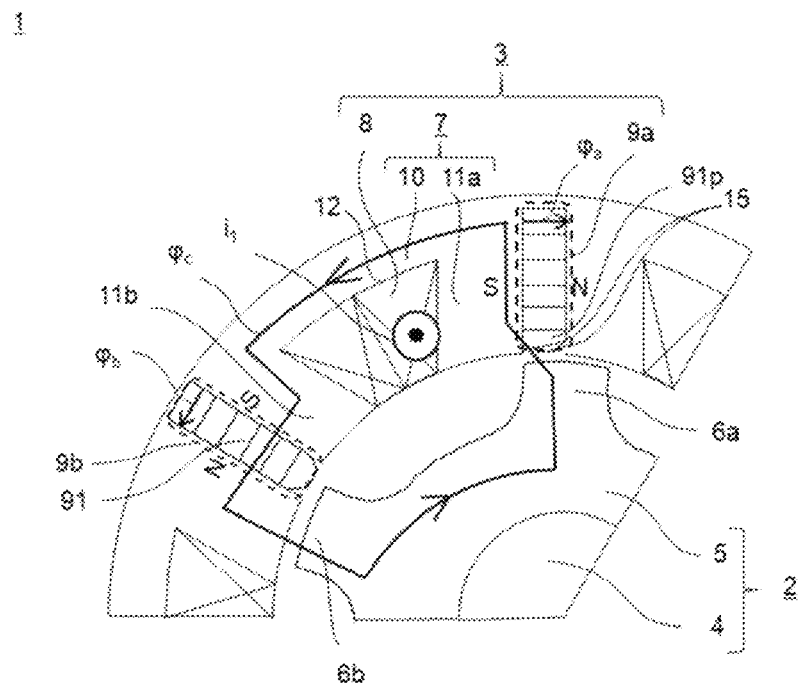
FIG. 17 is a sectional view for showing a schematic structure of another example of the rotary electric machine, in accordance with Embodiment 5 of the present disclosure.

FIG. 17 is a schematic configuration diagram showing another example of the rotary electric machine in accordance with Embodiment 5 of the present disclosure. In the example shown in FIG. 17, the corner portion of the permanent magnet 91 of the teeth 11 on the facing side to the rotor 2 is dropped off, at both the rotational direction front and the rotational direction back, and the permanent magnet 91$p$ has two chamfered surfaces 15. That is, the section perpendicular to the shaft direction of the permanent magnet 91$p$ is hexagon in the configuration. In this way, both of the corner portions on the facing side to the rotor 2 of the permanent magnet 91$p$ are dropped off, and the permanent magnet 91$p$ has two chamfered surfaces 15. Therefore, not depending on the rotational direction of the rotor 2, the eddy current loss of the magnet member 9 can be reduced.

Further, both in FIG. 16 and FIG. 17, there is shown an exemplary case in which a corner portion is dropped off, and the permanent magnet 91$p$ has a chamfered surface 15, and the section perpendicular to the shaft direction is pentagon or hexagon in the configuration. However, the corner portion can accept any configuration which is capable of controlling the eddy current by the magnetic flux, coming from the rotor 2 to the teeth 11. Polygon shape, of more than pentagon and hexagon, can be employed, and the corner portion can be dropped off in an arc like.

Embodiment 6

Figure 18:
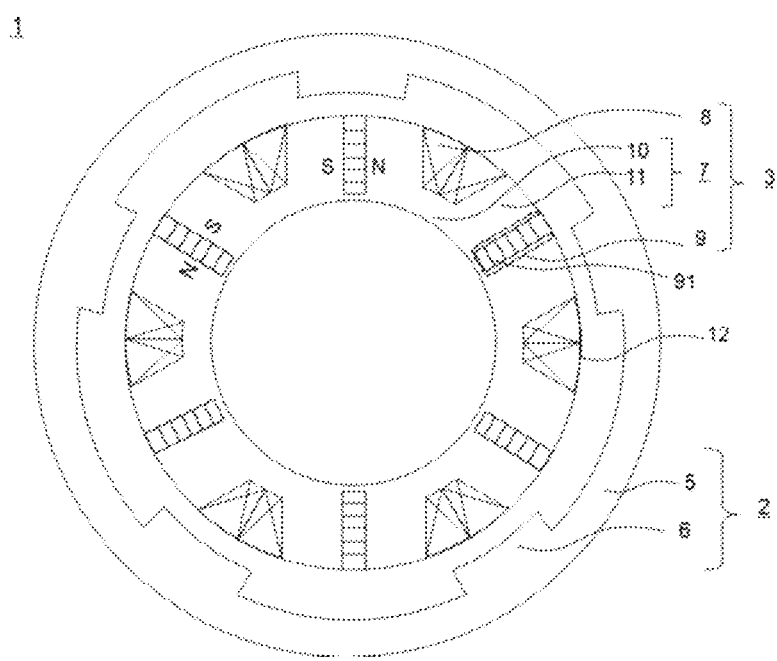
FIG. 18 is a sectional view for showing a schematic structure of a rotary electric machine, in accordance with Embodiment 6 of the present disclosure.

FIG. 18 is a sectional view showing the schematic structure of the rotary electric machine in accordance with Embodiment 6 of the present disclosure. In what follows, explanation about the same point as in Embodiment 1 is omitted, and explanation will be made focusing on a different point. In the Embodiments 1 to 6, there are shown exemplary cases in which the rotary electric machine 1 is the one of inner rotor type, which includes a rotor 2 disposed on the inside in the radial direction of the stator 3. However, in the present embodiment, there is shown an exemplary case in which the rotary electric machine 1 is of outer rotor type, which includes a rotor 2 disposed on the outside in the radial direction of the stator 3.

As shown in FIG. 18, the rotary electric machine 1 is equipped with a rotor 2 and a stator 3 of cylindrical shape, which is arranged on the inside in the radial direction of the rotor 2, holding a space in between. The rotor 2 has a rotor core 5. The rotor core 5 is provided with a plurality of protruding members 6, which protrudes to the inside in the radial direction. Each of the protruding members 6 is provided in the circumferential direction of the rotor core 5, holding a space in between with each other.

The stator 3 has a stator core 7, a stator coil 8, and a magnet member 9. The stator core 7 is, for example, a magnetic body made of electromagnetic steel plates, which are layer stacked along the shaft direction. The stator core 7 has a core back 10 of cylindrical shape and a plurality of teethes 11 which protrudes from the outer periphery surface side of the core back 10 to the outside in the radial direction. That is, each of the plurality of teethes 11 protrudes toward the rotor 2, and is provided along the circumferential direction of the core back 10, holding a space in between with each other. Between teethes 11 which lie next to each other in the circumferential direction, there is formed a slot 12 which is opened spatially to the outside in the radial direction of the stator 3, and creates a space extending in the shaft direction. In the slot 12, there is provided a stator coil 8 which is wound to the teeth 11. Further, a magnet member 9 is provided in each of the central parts in the radial direction of a plurality of teethes 11.

For example, in the respective central parts of the plurality of teethes 11, the magnet member 9 is provided to extend in the protruding direction of the teeth 11 and the shaft direction, and is formed of permanent magnets 91, which are each magnetized in the circumferential direction. The permanent magnets 91 of the magnet members 9 which lie next to each other in the circumferential direction by way of the slot 12 are arranged, facing the same magnetic pole with each other. That is, the permanent magnets 91 of the magnet member 9 which is provided in each of the plurality of teethes 11 are arranged, alternating their magnetic poles in the circumferential direction. The magnet member 9 is, for example, exposed from the teeth 11 on the inner periphery surface of the stator core 7, and is covered with the core back 10 on the outer periphery surface of the stator core 7. In the drawings, N and S indicate a magnetic pole of the permanent magnet 91 of the magnet member 9. As the permanent magnet 91 of the magnet member 9, a rare earth sintered magnet and a ferrite magnet are used, for example.

The magnet member 9 is formed of a plurality of permanent magnets 91, each of which is arranged in the protruding direction of the teeth 11. Or the magnet member 9 is formed of a permanent magnet 91 of a single body, which includes a groove portion 13 provided along the protruding direction of the teeth 11, holding a space in between, where the groove portion 13 extends in the shaft direction, and is disposed on the surface along the protruding direction of the teeth 11 and the shaft direction.

Since the rotary electric machine is equipped with such a magnet member 9, the path of an eddy current can be divided along the direction perpendicular to the protruding direction of the teeth 11. Divided eddy currents flow in the opposing directions of the shaft direction and those currents cancel each other out. Then, the eddy current loss can be reduced efficiently.

It is noted that, in the Embodiments 1 to 6, there is shown an exemplary case in which the number of the protruding members of the rotor 2 is 5, and both the teethes 11 of the stator 3 and the magnet members 9 are 6 in number. However, the number of poles, the number of slots, and the size of other respective portions are not limited particularly. For example, the number of the protruding members of the rotor 2 can be 4, and both the teethes 11 of the stator 3 and the magnet members 9 can be 6 in number. Further, the number of the protruding members 6 of the rotor 2 can be 10, and both the teethes 11 of the stator 3 and the magnet members 9 can be 12 in number.

Further, in the Embodiments 1 to 6, explanation is made about the electric motors which have winding wires of three phases, as the rotary electric machine 1. However, those motors are examples, and an electric motor which has winding wires of multiple phases, other than three phases can be accepted.

Further, the present disclosure can combine each of the embodiments within the scope of the invention freely, or can change and omit each of the embodiments suitably.

EXPLANATION OF NUMERALS AND SYMBOLS

1 Rotary electric machine; 2 Rotor; 3 Stator; 4 Rotational shaft; 5 Rotor core; 6, 6a and 6b Protruding member; 7 Stator core; 8 Stator coil; 9, 9a and 9b Magnet member; 10 Core back; 11, 11a and 11b Teeth; 12 Slot; 13 Groove portion; 14 Groove portion; 91 and 91p Permanent magnet

What is claimed is:

1. A rotary electric machine, comprising:
   a rotor; and
   a stator facing the rotor, such that there is a space between the stator and the rotor in a radial direction of the rotor, the stator including:
   a stator core including a core back of cylindrical shape and a plurality of teeth, where each of the plurality of teeth protrudes from the core back toward the rotor, and is along a circumferential direction of the rotor,
   a stator coil, wound to each of the plurality of teeth, and being in a slot between teeth lying next to each other in the circumferential direction, and
   a magnet member including a plurality of permanent magnets including at least three permanent magnets disposed in each of the plurality of teeth, where each of the plurality of permanent magnets has the same magnetic pole as each other in the circumferential direction, and is arranged in a protruding direction of the teeth,
   wherein, among the plurality of permanent magnets in the protruding direction of the teeth, a thickness of a permanent magnet becomes gradually smaller to the rotor, and a thickness of a closest permanent magnet to the rotor is a smallest thickness among thicknesses of remaining permanent magnets, along the protruding direction of the teeth, and
   wherein among the plurality of permanent magnets, each of the plurality of permanent magnets is in contact with the permanent magnets that are adjacent thereto.

2. The rotary electric machine according to claim 1, wherein the permanent magnets which lie next to each other in the circumferential direction by way of the slot are arranged, facing the same magnetic pole with each other.

3. The rotary electric machine according to claim 1, wherein a length of the permanent magnet along the protruding direction of the teeth is less than twice a skin depth d, which is given by $d=\{2/(\omega\mu\sigma)\}^{1/2}$, where ω is an angular frequency of a current which flows in the stator coil, μ is a magnetic permeability of the permanent magnet, and σ is an electric conductivity of the permanent magnet.

4. The rotary electric machine according to claim 1, wherein, in the magnet member, at least one of a surface on a facing side to the rotor and an opposite surface on the facing side is exposed from the stator core.

5. The rotary electric machine according to claim 1, wherein a distance from the magnet member to the rotor in the radial direction is larger than a distance from the stator core to the rotor in the radial direction.

6. The rotary electric machine according to claim 1, wherein, in the magnet member, the plurality of permanent magnets is arranged in a direction perpendicular to the protruding direction of the teeth.

7. The rotary electric machine according to claim 1, wherein a length of respective permanent magnets along a direction perpendicular to the protruding direction of the teeth is less than twice a skin depth d, which is given by $d=\{2/(\omega\mu\sigma)\}^{1/2}$,
where ω is an angular frequency of a current which flows in the stator coil, μ is a magnetic permeability of the permanent magnet, and σ is an electric conductivity of the permanent magnet.

8. A rotary electric machine, comprising:
a rotor; and
a stator facing the rotor, such that there is a space between the stator and the rotor in a radial direction of the rotor, the stator including:
a stator core including a core back of cylindrical shape and a plurality of teeth, where each of the plurality of teeth protrudes from the core back toward the rotor, and is along a circumferential direction of the rotor,
a stator coil, wound to each of the plurality of teeth, and being in a slot between teeth lying next to each other in the circumferential direction, and
a magnet member including a plurality of permanent magnets disposed in each of the plurality of teeth, where each of the plurality of permanent magnets has the same magnetic pole as each other in the circumferential direction, and is arranged in a protruding direction of the teeth,
wherein, among the plurality of permanent magnets which is arranged in the protruding direction of the teeth, a closest permanent magnet to the rotor is divided into two permanent magnets along the direction perpendicular to the protruding direction of the teeth.

9. The rotary electric machine according to claim 1, wherein the permanent magnet has a chamfered surface without a sharp corner portion, the chamfered surface extending along both the protruding direction of the teeth and a shaft direction of the rotor and a surface on a facing side to the rotor.

10. A rotary electric machine, comprising:
a rotor; and
a stator facing the rotor, such that there is a space between the stator and the rotor in a radial direction of the rotor, the stator including:
a stator core including a core back of cylindrical shape and a plurality of teeth, where each of the plurality of teeth protrudes from the core back toward the rotor, and is along a circumferential direction of the rotor,
a stator coil, wound to each of the plurality of teeth, and being in a slot between teeth lying next to each other in the circumferential direction, and
a magnet member including a permanent magnet disposed in each of the plurality of teeth, where the permanent magnet is magnetized in the circumferential direction and a plurality of grooves extend through permanent magnet in a shaft direction, extend in the circumferential direction, direction and are on opposite sides of each permanent magnet in the circumferential direction such that a first of the plurality of grooves is on a first side of one of the permanent magnets in the circumferential direction and another of the plurality of grooves of the one of the permanent magnets is on a second and opposite side of the one of the permanent magnets in the circumferential direction.

11. The rotary electric machine according to claim 1, wherein:
the length of the permanent magnets is smaller gradually, as the permanent magnets approach the rotor.

12. The rotary electric machine according to claim 10, wherein:
the plurality of grooves do not extend completely through the permanent magnets in the circumferential direction.

13. The rotary electric machine according to claim 1, wherein:
the plurality of magnets of the magnet member consists of exactly six permanent magnets.

14. The rotary electric machine according to claim 10, wherein:
the grooves are offset from each other such that a groove of the plurality of grooves on one side of the permanent magnet is offset in the radial direction from the shaft with respect to another groove of the plurality of grooves on an opposite side of the permanent magnet.

* * * * *